June 15, 1937.  N. C. HALLENBERG  2,084,252
AUTOMOBILE INDICATOR
Filed Dec. 9, 1936
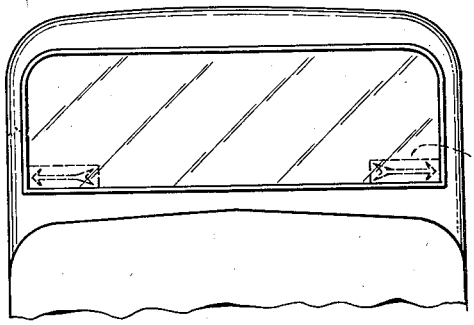
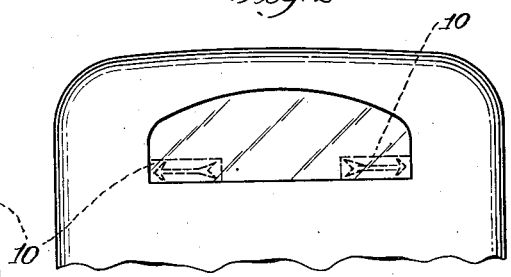
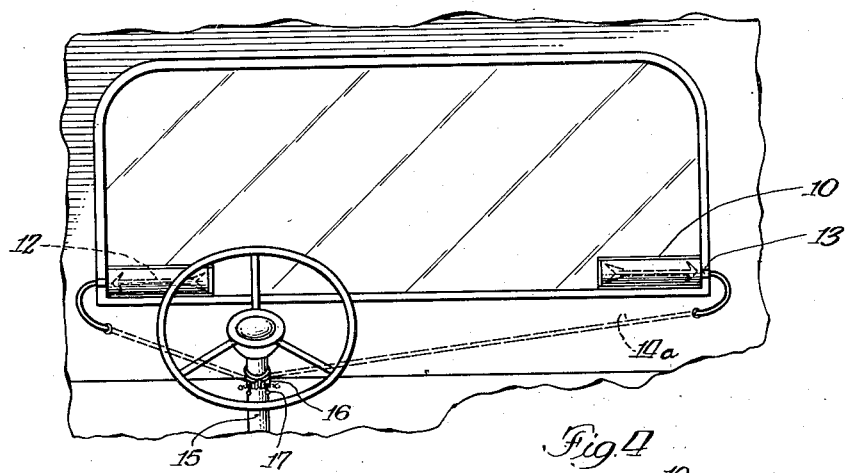
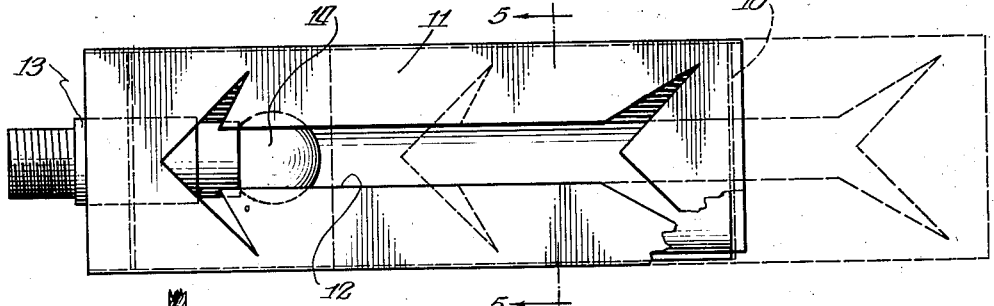
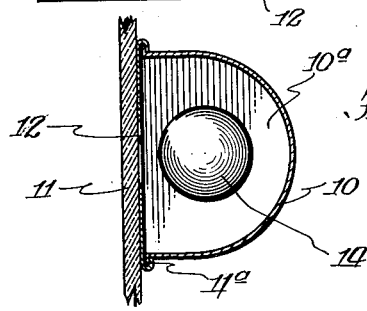
Inventor:
Nils C. Hallenberg
By Stevens + Batchelor
Atty's.

Patented June 15, 1937

2,084,252

UNITED STATES PATENT OFFICE 2,084,252

AUTOMOBILE INDICATOR

Nils C. Hallenberg, Chicago, Ill.

Application December 9, 1936, Serial No. 115,035

1 Claim. (Cl. 40—133)

My invention relates to automobile indicators, and more particularly to that type which are installed opposite the windshield or rear window of the car, and my main object is to provide an indicator assembly which is easily seen, yet compact enough to be out of the way.

A further object of the invention is to design the novel indicator for exhibiting a set of illuminated directional arrows to traffic approaching from the front or rear of the car.

A still further object of the invention is to construct and apply the units of the novel indicator so simply that brackets, supports, fastening devices or other complications are not required.

Another object of the invention is to design the units of the indicator for easy removal in case a replacement of the illuminating elements is required.

An important object of the invention is to construct the novel indicator of few and inexpensive parts, that it may be sold at a reasonable price.

With the above objects in view, and any others which may suggest themselves from the description to follow, a better understanding of the invention may be had by reference to the accompanying drawing in which—

Fig. 1 is a front elevation of an automobile body showing the application of the novel indicator to the windshield;

Fig. 2 is a rear view of the body, showing the application of the indicator to the rear window;

Fig. 3 is an enlarged view of the windshield and frontal body compartment from within, showing the arrangement of the indicator and its controls;

Fig. 4 is an enlarged elevation of the left-hand unit seen in Fig. 1, and showing a change of position by means of dotted lines; and Fig. 5 is a section on the line 5—5 of Fig. 4.

Various forms of automobile indicators have been developed in late years, but few have been adopted or put in practice, probably because they were either too expensive to purchase or install, or because they did not satisfactorily perform the service prescribed for them. An automobile indicator to be efficient must be simple, compact, easy to notice and inexpensive to buy. It is with these considerations in mind that I have designed the novel indicator, aiming to fully accomplish the objects outlined above.

In accordance with the foregoing, specific reference to the drawing indicates the unit typical of the indicator in the form of an elongated casing 10, having an open front and substantially semi-circular cross-section. The casing is formed with closed ends 10a but is outwardly flanged in front to be slideable in the top and bottom channels 11a of a sheet metal closure plate 11. This plate is cut out at 12 with the formation of an arrow. As the units are applied in pairs, the arrow formations of each pair will point in opposite directions, or outward, as indicated in Fig. 1.

One pair of indicator units is placed behind the windshield and at or near the ends thereof, in order to be at points nearest to the direction indicated. This relation is also had between another pair of units applied to the rear window of the car, as indicated in Fig. 2.

The indicator units 10 are applied directly to the windshield or rear window by cementing the sheet metal closure 11 to the glass. This expedient eliminates the use of brackets, bolts or other fastening means, and places the units compactly at the points of exhibit and out of the way.

Each casing 10 is provided with a socket 13 in its outer end which receives a lamp bulb 14 on the inside. The bulbs for the frontal units are preferably colored green, while those for the rear units are colored red. Thus, the units emit illuminated green arrows in front and red arrows to the rear when actuated.

The units are provided with cables or other suitable wiring 14a leading to a zone of control on the steering post 15. The latter receives a suitable collar 16 which carries a pair of standard toggle switches 17. Thus, the latter are downwardly directed when the indicator is not in operation. However, should the left-hand indicator units be the ones to be actuated, as when a left-turn is intended, then the left-hand toggle switch 17 is swung to the left, as indicated by dotted lines. The right-hand switch is similarly operated to put the right-hand indicator units into action. It is not necessary to show or describe the circuit intended for the indicator units, as the same is within the skill of any electrical service man; however, it may be said that where the windshield frame is of metal, it may form the ground terminal for the illuminating elements.

It will be seen that an indicator constituted as described above is an accessory of an efficient nature. First, the indicator units are situated in the bottom corners of the windshield or rear window, so as not to obstruct the vision of the driver or passengers. Further, the position of the indicators is logical in respect to the direction indicated and in the proper line of vision to motorists or pedestrians approaching from the front or following from the rear. Further, the manual controls of the units are handy and capable of better timing than automatic controls featured by some automobile indicators. Thus, the driver of a car equipped with the present indicator may actuate the left-hand or right-hand set of units, according to the direction in which he intends to turn, before he begins to do so. This action gives the approaching driver or pedestrian sufficient time to decide on or assume a course compatible with the signal or warning given by the indicator and so permit the car equipped with the latter to change its course in the desired direction with safety to all concerned. Further, an indicator arranged and attached as described lends itself readily to the approval of the average motor car owner, so that it is easier to popularize and become a familiar object for drivers and pedestrians to notice or expect in connection with motor car travel. Further, in case one of the lamp bulbs 14 burns out, it is an easy matter to slide the casing 10 toward the center of the windshield as indicated in Fig. 4 to secure its removal from the frontal closure 11 and render the defective bulb accessible for replacement. Finally, it will be evident that by directly attaching the indicator units to the glass not only are separate or complicated attaching means avoided, but the usual separate glass front provided for indicator casings is dispensed with; also, the illumination is direct, free of refraction and at the very front by the face-to-face application of the casing to the glass.

While I have described the invention along specific lines, the same is susceptible to various minor changes and refinements, and I consider all such changes and refinements as coming within the scope and spirit of the appended claim.

I claim:—

An automobile indicator comprising a plate, said plate being perforated to provide directional signal indicia, edge portions of said plate being formed to provide means for slidably attaching a casing thereto, means whereby said plate is cemented to the inner surface of an automobile window, a casing slidably attached to said plate, and a light source carried by said casing within the same.

NILS C. HALLENBERG.